Figure 3:
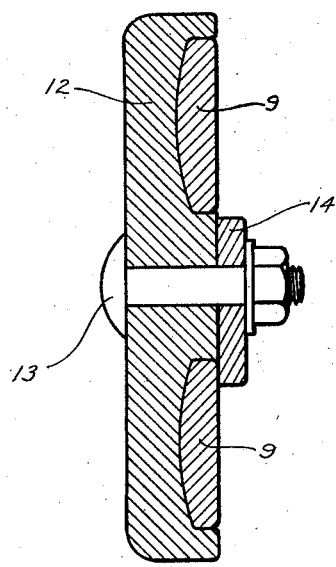

July 29, 1930.  E. H. McCLOUD  1,771,579
AUTOMOBILE BUMPER
Filed Nov. 9, 1929  2 Sheets-Sheet 1
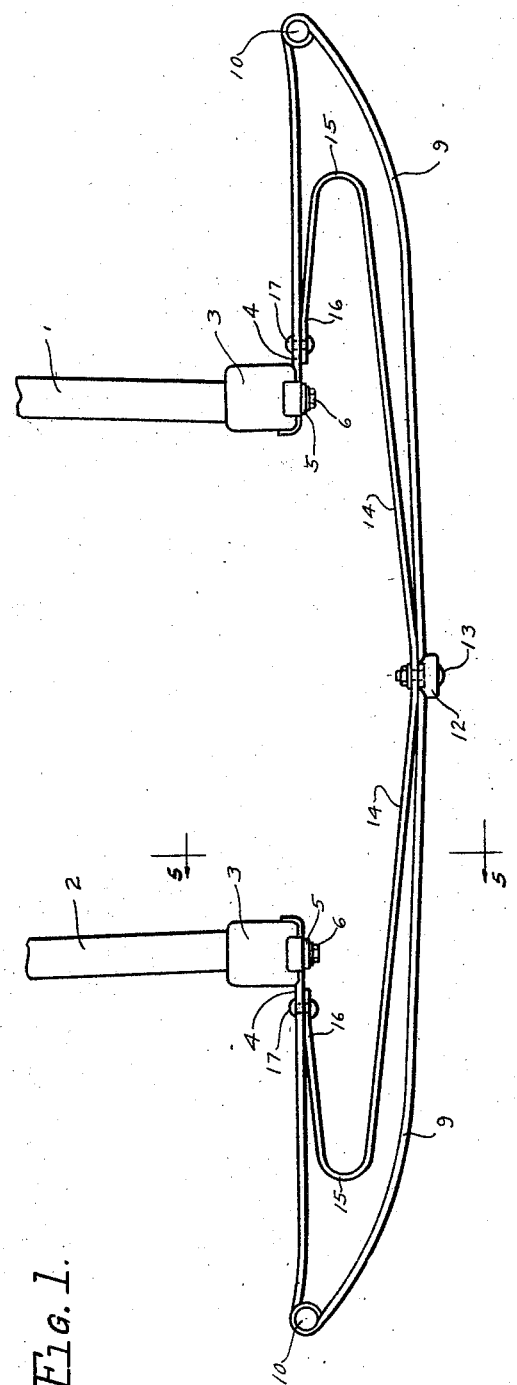
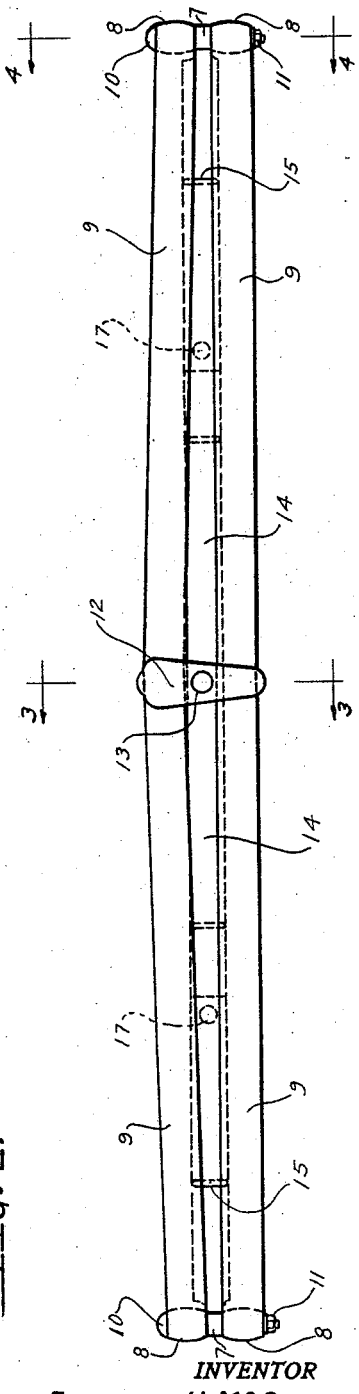
INVENTOR
EDWARD H. McCLOUD,
BY
ATTORNEYS July 29, 1930.　　　E. H. McCLOUD　　　1,771,579
AUTOMOBILE BUMPER
Filed Nov. 9, 1929　　　2 Sheets-Sheet 2

INVENTOR
EDWARD H. McCLOUD,
BY
ATTORNEYS

Patented July 29, 1930

1,771,579

UNITED STATES PATENT OFFICE

EDWARD H. McCLOUD, OF COLUMBUS, OHIO

AUTOMOBILE BUMPER

Application filed November 9, 1929. Serial No. 405,929.

My invention relates to automobile bumpers.

It is the object of my invention to provide a bumper which will distribute the impact strains and in which both the primary and supplementary impact members will be mounted upon a common supporting spring plate.

It is a further object to provide a construction which need only employ a single clamp thereby eliminating the present practice of multiple clamps which are expensive and multiply the chances of rattling.

It is a further object to provide all of the advantages of a bumper bar with rearwardly turned in ends without the disadvantages of having said rearwardly turned ends hooking into objects.

Figure 4:
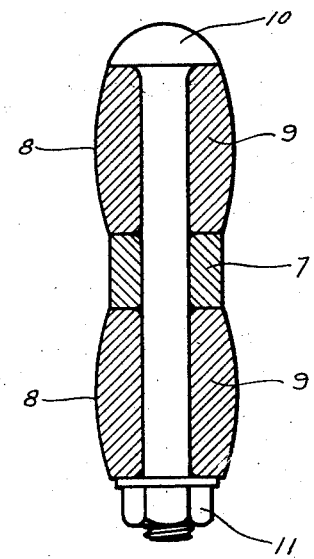
Figure 5:
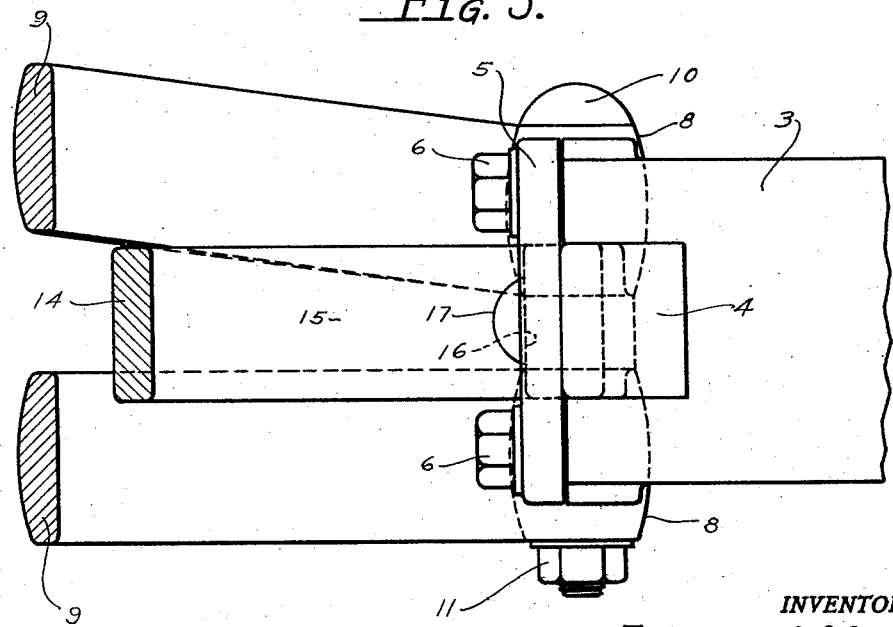

Referring to the drawings:

Figure 1 is a top plan view of the bumper;
Figure 2 is a front elevation;
Figure 3 is a section on the line 3—3 of Figure 2;
Figure 4 is a section on the line 4—4 of Figure 2;
Figure 5 is a section on the line 5—5 of Figure 1.

Referring to the drawings in detail, 1 and 2 are frame members of the vehicle on which are mounted the end pads 3 for receiving the spring supporting plate 4 held in position by clamps 5 and bolts 6. The outer ends of the spring supporting member are formed into eyes 7 which act as spacers between the eyes 8 of the bumper bars 9 and are then held in spaced relationship through the agency of the bolt 10 and nut 11.

The front bumper bars are connected together by a single clamping plate 12 the central portion of which between the general plane of the bars 9 is connected by the bolt 13 to the inner or secondary bumper 14 which has a U-shaped end 15 turned inwardly at 16 and connected to the spring supporting plates 4 by the rivets 17.

Thus the bumper provides adequate space between the frame members to crank the car or if placed on the rear there is ample space for a spare tire within the bumper. Any impact upon the primary bumper bars 9 and the secondary bumper 14 will be taken up by the yielding structure of the several bumper bars and will not tend to spread the frame. The forces on the bumper bar set up by impacts will not be delivered from the center of the bumper directly to points within the frame members, such as has been the case in many bumpers but will be distributed as described.

It will be understood that I desire to comprehend within my invention such modifications as may be clearly embraced within the scope of my claims and invention.

Having thus fully described my invention, what I claim as new and desire to secure by Letters Patent, is:

1. In a bumper in combination with frame members, a primary bumper means, spring plates connected to the ends thereof and the frame members and a secondary bumper means connected to the primary bumper means and at each end to said spring supporting plates.

2. In a bumper, a primary bumper means, spring plates connected to the ends thereof and the frame members and a secondary bumper means connected to the primary bumper means and to said spring supporting plates at a point between the point of attachment of the spring supporting plate to the primary bumper and the frame members.

3. In combination with frame members, a primary bumper means extending across and beyond the frame members of the vehicle, independent supporting plates connected to the extreme ends thereof and to the ends of the frame members and supplementary secondary bumper means connected to the primary bumper means within the ends thereof and to the spring supporting plates between the ends thereof.

4. In combination, a primary bumper means extending across and beyond the frame members of the vehicle, independent supporting plates connected to the extreme ends thereof and to the ends of the frame members and supplementary secondary bumper means connected to the primary bumper means within the ends thereof and to the spring supporting plates between the ends thereof, said secondary bumper means comprising vertically disposed U-shaped spring means.

5. In combination, in a bumper in association with the frame members of a vehicle, a primary bumper means extending across and beyond the frame members of the vehicle, inwardly extending and rearwardly disposed bumper supporting plates connected to the said bumper and to the said frame members thereby forming U-shaped ends and concentrically disposed secondary bumper means, portions of which are connected to the bumper means and spring supporting plates between the ends thereof.

6. In combination, in a bumper associated with the frame ends of a vehicle, laterally and outwardly extending spring supporting plates, a bumper mounted on the extreme ends thereof, a second bumper substantially concentric with the first, connected at the center to the center of the first and at its extreme ends to the spring supporting plates outside of the frame ends.

7. In combination, in a bumper associated with the frame end of a vehicle, a pair of spaced bumper bars, relatively shorter rearwardly disposed spring supporting plates, each connected at one end to one of the ends of and between the bumper bars and at the other end to the ends of the vehicle frame members and a bumper bar connected at each end to a supporting plate and contacting intermediate its ends with said spaced bumper bars.

8. In combination, in a bumper associated with the frame end of a vehicle, a pair of spaced bumper plates, relatively shorter rearwardly disposed spring supporting plates connected to the ends thereof therebetween and to the ends of the vehicle frame members and an inwardly disposed single bumper member in the same plane with the spring plates having U-shaped ends extending rearwardly and inwardly connected to said spring plate.

9. In combination, in a bumper associated with the frame end of a vehicle, a pair of spaced bumper plates, relatively shorter rearwardly disposed spring supporting plates connected to the ends thereof therebetween and to the ends of the vehicle frame members, and an inwardly disposed single bumper member in the same plane with the spring plates having U-shaped ends extending rearwardly and inwardly connected to said spring plate and centrally with the centers of the spaced bumper bars.

10. In combination, in a bumper associated with the frame end of a vehicle, a pair of spaced bumper plates, relatively shorter rearwardly disposed spring supporting plates connected to the ends thereof therebetween and to the ends of the vehicle frame members, and an inwardly disposed single bumper member in the same plane with the spring plates having U-shaped ends extending rearwardly and inwardly connected to said spring plate and centrally with the centers of the spaced bumper bars and a clamp for maintaining said centers in predetermined horizontal and vertical alignment.

11. In combination, an arcuate front bumper, an arcuate laterally shorter inner bumper having inwardly turned U-shaped ends and spring supporting plates mounted on vehicle frame member ends adapted to support all of the free ends of the same bumper members.

12. In combination, an arcuate front bumper, an arcuate laterally shorter inner bumper having inwardly turned U-shaped ends and spring supporting plates mounted on the vehicle frame member ends adapted to support all of the free ends of the said bumper members, the connection between the outer bumper and the spring plate being pivotal and the connection between the inner bumper and the spring plates being a permanent connection.

13. In combination, in a bumper associated with the vehicle frame ends, outwardly extending straight spring plates mounted transversely of the frame member ends, arcuate bumper means pivotally mounted on the extreme ends of said plates and a secondary bumper means concentric with the first mentioned bumper means of less lateral dimensions having inwardly turned U-shaped ends permanently connected to said plates.

14. In combination, in a bumper associated with the vehicle frame ends, outwardly extending straight spring plates mounted transversely of the frame member ends, arcuate bumper means pivotally mounted on the extreme ends of said plates and a secondary bumper means concentric with the first-mentioned bumper means of lesser lateral dimensions having inwardly turned U-shaped ends permanently connected to said plates at a point outside of the frame ends.

15. In combination, in a bumper associated with the vehicle frame ends, outwardly extending straight spring plates mounted transversely of the frame member ends, arcuate bumper means pivotally mounted on the extreme ends of said plates and a secondary bumper means concentric with the first mentioned bumper means of lesser lateral dimensions having inwardly turned U-shaped ends permanently connected to said plates at points outside of the frame ends, said parts being so arranged that the inner bumper and the spring plates will be in one plane and the outer bumper bars will be in different planes.

In testimony whereof, I affix my signature.

EDWARD H. McCLOUD.